United States Patent [19]

Feely

[11] 4,387,190

[45] Jun. 7, 1983

[54] AUTOXIDIZABLE COMPOSITIONS CONTAINING LOW MOLECULAR WEIGHT POLYMERS OF DICYCLOPENTENYL METHACRYLATE OR DICYCLOPENTENYLOXYALKYL METHACRYLATE

[75] Inventor: Wayne E. Feely, Rydal, Pa.

[73] Assignee: Rohm & Haas Company, Philadelphia, Pa.

[21] Appl. No.: 289,638

[22] Filed: Aug. 3, 1981

[51] Int. Cl.³ .......................... C09D 3/66; C09D 3/81
[52] U.S. Cl. .................................... 525/175; 106/264; 204/159.19; 204/159.23; 204/159.24; 204/161; 525/242; 525/298
[58] Field of Search ........ 260/22 CB, 23.5 R, 23 AR; 106/264; 525/175, 242, 298; 204/159.19, 159.23, 159.24, 161

[56] References Cited

U.S. PATENT DOCUMENTS

| | | | |
|---|---|---|---|
| 2,482,761 | 9/1949 | Goebel | 260/407 |
| 4,071,489 | 1/1978 | Emmons et al. | 260/22 CB |
| 4,097,677 | 6/1978 | Emmons et al. | 560/220 |
| 4,100,133 | 7/1978 | Emmons et al. | 260/45.9 L |
| 4,131,580 | 12/1978 | Emmons et al. | 260/29.6 RW |
| 4,138,390 | 2/1979 | Emmons et al. | 260/45.9 L |
| 4,141,868 | 2/1979 | Emmons et al. | 260/23 AR |
| 4,145,503 | 3/1979 | Emmons et al. | 526/282 |
| 4,197,225 | 4/1980 | Emmons et al. | 260/23 AR |
| 4,261,872 | 4/1981 | Emmons et al. | 260/22 CB |
| 4,311,624 | 1/1982 | Emmons et al. | 260/22 CB |

OTHER PUBLICATIONS

F. R. Mayo and A. A. Miller, *J. Amer. Chem. Soc.*, 80, 2493 (1958).
*J. Amer. Oil Chemists Association*, 24, 65 (1947).
H. F. Payne in "Organic Coating Technology", vol. 1, pp. 275-277, John Wiley & Sons, Inc., NY 1954.

*Primary Examiner*—Ronald W. Griffin
*Attorney, Agent, or Firm*—Lester E. Johnson

[57] ABSTRACT

An improved autoxidizable coating and/or impregnating composition consisting essentially of:

(1) from about 35% to about 80% by weight, based on the total weight of components (1), (2), and (3), of a film-forming component selected from the group consisting of drying oils, alkyd resins, and mixtures of drying oils and alkyd resins, (2) from about 10% to about 50% by weight, based on the total weight of components (1), (2), and (3), of a polymer of a molecular weight in the range of 1,000–50,000 (Mn) polymerized from a monomer system comprising:

(a) from about 40% to 100% by weight of at least one monomer selected from the group consisting of dicyclopentenyl methacrylate and dicyclopentenyloxyalkyl methacrylate, and (b) from about 60% to 0% by weight of at least one compatible monomer, (3) from 0 to about 40% by weight, based on the total weight of components (1), (2), and (3), of a reactive, non-volatile diluent monomer, and (4) an effective amount of at least one polyvalent metal salt or complex that catalyzes the oxidative curing of components (1), (2), and (3), wherein the total of the percentages of components (1), (2), and (3) is 100.

24 Claims, No Drawings

AUTOXIDIZABLE COMPOSITIONS CONTAINING LOW MOLECULAR WEIGHT POLYMERS OF DICYCLOPENTENYL METHACRYLATE OR DICYCLOPENTENYLOXYALKYL METHACRYLATE

BACKGROUND OF THE INVENTION

1. Field of the Invention

This invention relates to high solids coating and/or impregnating compositions, curable at ambient conditions, containing a film-forming component, a low molecular weight polymer containing units from dicyclopentenyl methacrylate and/or dicyclopentenyloxyalkyl methacrylate, a polyvalent metal salt or complex, and, optionally, a reactive, non-volatile diluent monomer.

Interest in the preservation of the environmental quality and in the conservation of energy, manifested by governmental implementation of increasingly stringent anti-pollution and energy conservation regulations, has generated considerable interest in the use of reactive diluents in coating compositions. These diluents are generally high boiling, low viscosity monomers that function as solvents during application but undergo cure of some kind, especially preferably under ambient conditions, and thereby become an integral part of the product coating. Pollution attributable to conventional solvent emissions is thereby reduced or eliminated and the necessity of a source of heat to evaporate solvent from the applied coating composition and to effect cure thereof is also thereby obviated.

2. Description of Relevant Art

Emmons, Nyi and Sperry, U.S. Pat. No. 4,071,489, issued Jan. 31, 1978, disclose air-drying coating compositions based on alkyd resins comprising at least one of dicyclopentenyl methacrylate or dicyclopentenyl acrylate, and a polyester or an alkyd resin having at least one unsaturated component curable by the addition thereto of a drier or a siccative, the composition optionally containing a volatile oxime stabilizer to prevent the oxidizing action of the drier when it is included in the composition prior to storage. The composition may optionally include addition and condensation polymers (see col. 6, lines 36-41).

Emmons, Nyi and Sperry, U.S. Pat. No. 4,100,133, issued July 11, 1978, disclose autoxidizable compositions comprising at least one of dicyclopentenyl methacrylate or dicyclopentenyl acrylate, a copolymer containing at least one of dicyclopentenyl methacrylate and dicyclopentenyl acrylate, a siccative, and a volatile oxime stabilizer. The patent also discloses cured film products thereof. The optional inclusion of an addition or condensation polymer is described at col. 5, lines 30-35.

Emmons, Nyi and Sperry, U.S. Pat. No. 4,138,390, issued Feb. 6, 1979, disclose autoxidizable compositions comprising at least one of dicyclopentenyl methacrylate and dicyclopentenyl acrylate, a film-forming vinyl addition polymer having a molecular weight of 20,000 to 350,000 amu, a drier, and a volatile oxime stabilizer. the patent also discloses air-dried film products thereof.

Emmons, Nyi and Sperry, U.S. Pat. No. 4,131,580, issued Dec. 26, 1978, relates to film-forming polymer dispersions comprising aqueous solutions of polymers of monoethylenically unsaturated monomers (as well as dispersions) plus dicyclopentenyl acrylate or methacrylate and a drier.

Emmons and Nyi, U.S. Pat. No. 4,097,677, issued June 2, 1978, discloses, as reactive, non-volatile monomers, dicyclopentenyloxyalkyl methacrylate and dicyclopentenyloxyalkyl acrylate, which are useful in the production of polymers, in coating and/or impregnating compositions, and/or in molding, casting, or otherwise forming shaped articles. The patent discusses generally the use of these reactive, non-volatile monomers in certain alkyd resins in combination with a polymeric material and a drier. The amounts of polymeric material may be from 0.5 to 25% by weight based on the total weight of monomer and alkyd resin (see col. 8, lines 8-25). It is also noted that these monomers from linear homopolymers and copolymers (with other monoethylenically unsaturated monomers) while leaving the unsaturation of the dicyclopentenyl ring intact (see col. 2, lines 54-57). Examples 15-17 discuss homopolymers and copolymers of dicyclopentenyloxyethyl methacrylate. Examples 18-20 describe coating compositions containing the polymers of Examples 15-17 plus dicyclopentenyloxyethyl methacrylate monomer and a drier (conditions C and D—see Table D). None of these compositions contains an alkyd resin or drying oil component.

Emmons and Nyi, U.S. Pat. No. 4,145,503, issued Mar. 20, 1979, which is a continuation-in-part of the application which issued as U.S. Pat. No. 4,097,677, and Emmons and Nyi, U.S. patent application Ser. No. 908,427, filed May 22, 1978 now U.S. Pat. No. 4,261,782 issued Apr. 14, 1981, which is a continuation-in-part of the application which issued as U.S. Pat. No. 4,145,503, disclose coating and/or impregnating compositions, curable by autoxidation, of at least one of dicyclopentenyloxyalkyl methacrylate or dicyclopentenyloxyalkyl acrylate, a drying oil or a film-forming addition or condensation polymer, a siccative, and, optionally, a volatile oxime stabilizer. The film-forming polymer may be an alkyd resin having an autoxidative functionality, a condensation polymer modified with an acrylate or methacrylate functionality as end groups or pendant groups, or a vinyl addition polymer (including copolymers of dicyclopentenyl acrylate or methacrylate). The film-forming polymer may have a molecular weight in the range of from about 500 to about 15,000 amu (col. 4, lines 15-17).

Although the use of dicyclopentenyloxyalkyl methacrylates has presented improvement in the class of reactive diluent monomers, further improvement is desired. In some applications, especially those conducted at ambient temperature, that is, 0°-100° F., dicyclopentenyloxyalkyl methacrylates, for example, dicyclopentenyloxyethyl methacrylate, and compositions based thereon cure more slowly than is desirable. This slow cure rate is believed to be caused, in part, by oxygen inhibition of homopolymerization, a phenomenon well established with methacrylate monomers as reported by F. R. Mayo and A. A. Miller, *J. Amer. Chem Soc.*, 80, 2493 (1958). While oxygen is needed by the methacrylate monomer to form the hydroperoxide requisite for homopolymerization, excessively high oxygen concentration results in the slow formation of a copolymer containing alternating units of oxygen and the methacrylate monomer rather than in rapid homopolymerization of the methacrylate monomer-containing systems, it is often necessary to add polymerization accelerators, such as peroxides or hydroperoxides, to compositions containing monomers such as dicyclopentenyloxyalkyl methacrylates. This, however, generally diminishes the storage stability of such systems.

SUMMARY OF THE INVENTION

It has been surprisingly and unexpectedly discovered that low molecular weight polymers containing units from dicyclopentenyl methacrylate or dicyclopentenyloxyalkyl methacrylates, for example, dicyclopentenyloxyethyl methacrylate, in combination with an alkyd resin or drying oil or mixtures thereof, a polyvalent metal salt or complex, and, optionally, a reactive, non-volatile diluent monomer, form a unique coating and/or impregnating system, curable at ambient conditions. This combination provides coating compositions characterized by a broad range of useful properties, especially surface and physical mechanical properties. Furthermore, the combination of the invention provides formulations which are rapidly drying at ambient temperatures and which can be applied as high solids coatings. The instant coating systems surpass known alkyd resin systems modified with standard Acryloid ® modifiers in gasoline and solvent resistance. It also surpasses in drying time alkyd resin systems having dicyclopentenyloxyethyl methacrylate as reactive diluent monomer, especially as regards the long "flypaper" stage between setting and touch-tack free states. It is readily apparent that the present compositions constitute a significant advance in alkyd resin and drying oil composition technologies, and that this invention overcomes the slow cure barrier associated with alkyd resins, particularly long oil alkyd resins, and with alkyd resin/reactive diluent systems.

Accordingly, the invention comprises an improved composition for coating and/or impregnating composition consisting essentially of:

(1) from about 35% to about 80% by weight, based on the total weight of components (1), (2), and (3), of a film-forming component selected from the group consisting of drying oils, alkyd resins, and mixtures of drying oils and alkyd resins, (2) from about 10% to about 50% by weight, based on the total weight of components (1), (2), and (3), of a polymer of a molecular weight in the range of 1,000–50,000 ($\overline{M n}$) polymerized from a monomer system comprising:

(a) from about 40% to 100% by weight of at least one monomer selected from the group consisting of dicyclopentenyl methacrylate and dicyclopentenyloxyalkyl methacrylate, and (b) from about 60% to 0% by weight of at least one compatible monomer, (3) from 0 to about 40% by weight, based on the total weight of components (1), (2), and (3), of a reactive, non-volatile diluent monomer, and (4) an effective amount of at least one polyvalent metal salt or complex that catalyzes the oxidative curing of components (1), (2), and (3), wherein the total of the percentages of components (1), (2), and (3) is 100.

In another aspect, the invention comprises cured articles, such as films, obtained by the autoxidation, in the presence of oxygen, of a composition according to the invention.

The film-forming component of the autoxidizable composition of the invention may be:

(a) one or more drying oils per se, such as linseed oil, safflower oil, soybean oil, tung oil, dehydrated castor oil, oiticica oil, menhaden oil or the like, or mixtures of such oils, which have inherent autoxidizable functionality that operates in the presence of a siccative or drier, and/or (b) an alkyd resin having unsaturation derivable from the use of (1) an ethylenically unsaturated dicarboxylic acid, such as fumaric or maleic acid, as part or all of the polycarboxylic acid component of the alkyd resin and/or (2) and unsaturated fatty acid or unsaturated oil having drying or semi-drying characteristics.

Examples of aromatic polycarboxylic acids that may be used in preparing the alkyd are o-phthalic acid or anhydride, terephthalic acid, isophthalic acid. Alkyds based upon isophthalic acid are known to dry faster than their phthalic acid counterparts and would, therefore, be preferred. Aliphatic dicarboxylic acids may be used having at least four carbon atoms and up to 36 to 40 or more carbon atoms. The dibasic acids are preferably those in which carboxylic groups are separated by unsubstituted saturated or unsaturated aliphatic hydrocarbon groups although such groups may be substituted by hydroxyl groups as in malic acid or even halogen atoms, e.g., chlorine. Examples of the aliphatic dicarboxylic acids (useful in either acid or anhydride form) that may be used in forming the unsaturated alkyds including the aforementioned oil-modified alkyds include adipic, malic, fumaric, pimelic, suberic, azelaic, and sebacic acid. Also useful are the various commercially available grades of dimer acid obtained by polymerizing linoleic acid as described in U.S. Pat. No. 2,482,761 and *J. Amer. Oil Chemists Association* 24, 65 (1947). The composition of one such dimer acid (sold under the designation Emery 955 dimer acid) is described in H. F. Payne, "Organic Coating Technology," Vol. 1, pp. 275-7, John Wiley & Sons, Inc., N.Y., 1954, and apparently contains a small proportion of trimers having three carboxyl groups. The pertinent disclosure of these three references is incorporated herein by reference. The polyols used in making the alkyd may have two to six hydroxyl groups and from two to eight carbons and include ethylene glycol, diethylene glycol, glycerol, propylene glycol, erythritol, and pentaerythritol.

Typical drying oils that may be employed as the oil-modifying component of an oil-modified alkyd are mono-, di-, and tri-glycerides of higher fatty acids having a relatively high degree of unsaturation such as linseed oil, safflower oil, tung oil, soybean oil, dehydrated castor oil, oticica oil, menhaden oil, etc. The alkyd may comprise combined therein one or more of such drying oils whether of tri-glyceride, mono-glyceride, di-glyceride type of the corresponding carboxylic acid or anhydride. Use of the term "drying" oil is intended herein to embrace those oils, whether of natural or artificial origin, that are characterized by reaction with oxygen to form cured solid products. It is intended to embrace in this term those so-called "semi-drying" oils which, because of a lesser degree of unsaturation, are not as rapid in curing in this fashion as the most typical drying oils that are on this account most commonly used in the paint and varnish industries. Thus, the oil-modified alkyds with which the invention is concerned are those in which at least a part of the oil modification is composed of drying (or semi-drying) oil. There is no intention to spell out any limitation as to the methods by which the unsaturated alkyd, including the oil-modified alkyd resin, is produced since the methods of making this particular component, if used in the composition, are well-known. The alkyds employed may be long-, medium-, or short-oil products. Generally, the short-oil alkyds have about 42 to 50% oil to 45 to 39% of the diacid used in making the alkyd; the medium-oil alkyds contain 53 to 61% oil to 36 to 30% of the diacid and the long-oil alkyd contains about 64 to 70% oil to 28 to 23% diacid. Preferably, the medium-oil-modified alkyds and, most preferably, the long-oil-modified alkyds are employed in the compositions of the present invention. Such oil-modified resins are generally adaptable to air-drying whereas the short-oil-modified alkyds generally require baking to accomplish their curing.

The film-forming component may be present in from about 35% to about 75%, preferably about 40% to about 60% by weight, based on the total weight of components (1), (2), and (3).

The low molecular weight polymers useful in the compositions of the present invention have a number average molecular weight (Mn) in the range of about 1,000–50,000, preferably about 2,000–15,000, and comprises a homopolymer of dicyclopentenyl methacrylate or dicyclopentenyloxyalkyl methacrylate, or a copolymer of these monomers with up to 60 percent of at least one compatible monomer selected from the groups consisting of t-butylaminoethyl methacrylate, dimethylaminoethyl methacrylate, isobornyl methacrylate, styrene, vinyl toluene, p-methyl styrene, methacrylic acid, methyl methacrylate, butyl methacrylate, isobutyl methacrylate, lauryl methacrylate, allyl methacrylate, and 2-ethylhexyl methacrylate. By the expression "dicyclopentenyloxyalkyl methacrylate" is meant those monomers having the formula

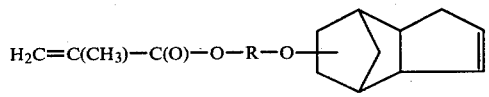

wherein R is (a) a ($C_2$–$C_6$)alkylene group or (b) a ($C_4$–$C_{12}$) oxaalkylene group having one or more oxygen atoms joining distinct segments of the alkylene chain having at least two carbon atoms. Dicyclopentenyloxyethyl methacrylate (DCPOEMA) is preferred among these monomers.

The low molecular weight polymers may be produced by anionic polymerization or by free radical initiated polymerization systems. The anionic and free radical polymerization procedures for making the low molecular weight polymers are known.

The anionic polymerization of the required methacrylate esters or mixtures thereof with one or more of the compatible monomers may be carried out in the presence of an alkoxide anion which serves as a catalyst and an alcohol, which acts as a chain-regulating agent. The reaction medium may, if desired, also contain an inert organic solvent, such as benzene, xylene or toluene. Examples of alkoxides are sodium or potassium methoxide, ethoxide or t-butoxide. The molar ratio of the chain-regulating alcohol to the total monomer charge is generally from about 1:4 to 1:50. The temperature of the reaction may be in the range of bout 40° C. to 130° C. The amount of alkoxide may be from about 0.4 to about 4 mole percent. The anionic polymerization of alkyl methacrylates to product homopolymers and copolymers is disclosed in U.S. application Ser. No. 137,057, filed Apr. 23, 1971, now-abandoned, and U.S. application Ser. No. 371,921, filed June 20, 1973 as a continuation-in-part of the earlier application, now-abandoned, and U.S. Pat. No. 4,103,093 issued July 25, 1978, for example.

Alternatively, the free radical polymerization of the required methacrylate esters or mixtures thereof with one or more of the compatible monomers may be carried out by known solution polymerization procedures or aqueous emulsion polymerization procedures, using a free radical initiator in conjunction with conventional chain-regulating agents, such as mercaptans, methylene chloride, bromotrichloromethane, etc. Low molecular weight polymers having the number average molecular weight in the ranges specified above are obtained by using a large proportion of free radical initiator and/or of chain-regulating agent.

These polymerization procedures are described, for example, in U.S. Pat. No. 4,120,839 issued Oct. 17, 1978 to the same assignee to which the present application is assigned.

The monomers are also polymerizable by radiation, e.g., actinic radiation, such as ultraviolet rays, or high energy ionizing radiation, such as electron beam radiation.

A photoinitiator or sensitizer may be added to the composition before exposing it, e.g., in the form of coatings, to radiation, e.g., actinic energy. A photoinitiator or sensitizer may be used in an amoung of about 0.1 to about 25% by weight, and preferably from about 1 to 15% by weight, of the total polymerizable composition.

Alternatively, the monomers may be polymerized by autoxidation added by use of a metal drier siccative. This action may also occur with the final linear polymers still containing the dicyclopentenyl ring unsaturation.

The low molecular weight polymer is present in from about 10% to about 50%, preferably about 15% to about 25% by weight, based on the total weight of components (1), (2), and (3).

The reactive non-volatile, diluent monomer component, which is an optional component of the compositions of the invention, may be dicyclopentenyl methacrylate, dicyclopentenyloxyethyl methacrylate, a polyfunctional methacrylate, hydroxypropyl methacrylate, dicyclopentanyl (meth)acrylate or mixtures of one or more of these monomers. Di- and tri-functional (meth)acrylate monomers include, for example, glycol or polyol (meth)acrylates, e.g., ethylene glycol di(meth)acrylates, trimethylolpropane tri(meth)acrylate, neopentyl glycol di(meth)acrylate; 1,6-hexanediol di(meth)acrylate, pentaerythritol tri- and tetra-(meth)acrylate; 1,3- and 1,4-butanediol di(meth)acrylate, 1,2- and 1,3-propanediol di(meth)acrylate; allyl(meth)acrylate. Preferably, the reactive, non-volatile diluent monomer is selected from the group consisting of dicyclopentenyloxyethyl methacrylate, dicyclopentenyl methacrylate, trimethylolpropane triacrylate, 1,4-butanediol diacrylate, 1,6-hexanediol diacrylate, 1,3-propanediol diacrylate, 1,2-ethylene diacrylate, 1,2-propanediol diacrylate, allyl methacrylate, hydroxyethyl methacrylate and allylphthalate, and di-, tri- and polyesters of acryloxypropionic acid.

As mentioned above, the reactive, non-volatile, diluent monomer system can comprise from 0 to about 40% by weight, preferably from about 5% to about 25% by weight, based on the total weight of components (1), (2), and (3).

By the expression "non-volatile" as applied to the reactive diluent monomer, it is intended herein that the reactive monomer or mixture thereof must have a vapor pressure/reactivity balance under the conditions of cure, ambient or force-dry, such that no more than about 5% by weight of reactive monomer is lost by evaporation during cure of the film coatings formed from the compositions of the invention.

The final component of the autoxidizable composition is at least one polyvalent metal salt or complex, or mixture thereof. This salt or complex is commonly called a drier or siccative or mixture thereof and it is used in an amount effective to autoxidatively cure components (1), (2), and, if present, (3). This component may be any polyvalent metal-containing complex or salt that catalyzes the oxidative curing of drying oils or drying oil-modified alkyd resins. Examples of the driers are various polyvalent metal salts including calcium, copper, zinc, manganese, lead, cobalt, iron, vanadium, and zirconium as the cation. Simple inorganic salts are useful, such as the halide, chloride, nitrate, and sulfate. However, in circumstances where the vehicle is of an organic nature, it is frequently preferred to use salts of organic acids, such as the acetylacetonate, acetate, propionate, butyrate and the like. The dries may also be complex reaction products of metal oxides, acetates, or borates and vegetable oils. Generally, the most useful driers are salts of naphthenic acids or of ($C_8$–$C_{30}$) aliphatic acids. Examples of the polyvalent metal include calcium, copper, zinc, manganese, lead, cobalt, iron, vanadium, and zirconium. Examples of aliphatic or fatty acid component, or anion, of the drier are naphthenic acids, resinic acids, (that is, rosin acids), tall oil fatty acids, linseed oil fatty acids, 2-ethylhexanoic acid, lauric acid, palmitic acid, octanoic acid, and 2,2-dimethyloctanoic acid ("neodecanoic acid"), myristic acid, stearic acid, oleic acid, linoelic acid, linolenic acid, behenic acid, cerotic acid, montanic acid, and abietic acid. Preferred drier salts are those of cobalt and manganese, such as cobalt octoate, cobalt naphthenate, manganese octoate and manganese naphthenate. Mixtures of various driers mentioned in "Encyclopedia of Chemical Technology", Kirk-Othmer, Volume 5, pages 195–205, published by Interscience Encyclopedia, Inc., N.Y. (1950) may be used.

An optional component of the autoxidizable composition of the invention is a volatile stabilizer or inhibitor, such as a volatile ketone-oxime or aldehyde-oxime. Specific examples are methyl ethyl ketone-oxime, methyl butyl ketone-oxime, 5-methyl-3-heptanone-oxime, cyclohexanone-oxime, and butyraldehyde-oxime. Addition of such inhibitors is not essential to long-term stability and pot life of the blends of components (1), (2) and (3), but under certain circumstances, the addition may be beneficial.

The proportion of the drier may be quite low and is generally used in the amount of 0.0005 to 2% metal content by weight of components (1), (2), and (3). The drier may be added to the composition prior to storage provided such addition is made in the absence of oxygen, or a volatile stabilizer is included in the composition to inhibit or prevent the oxidizing action of the drier and the composition is placed in closed storage containers to prevent volatilization of the inhibitor. The stabilizer may be used in a small proportion of 0.1% to 2% by weight based on the weight of components (1), (2), and (3).

Depending on the particular purpose for which the coatings are intended, the compositions may comprise an opacifying filler or a pigment or dye in a proportion of as low as one-fourth percent by weight to 150% or more by weight, based on the weight of binder in the composition. Examples of such coloring materials include flakes of metal, e.g., steel or aluminum, carbon black, copper oxides, red iron oxide, chrome green, molybdate, chrome orange, phthalocyanines, such as copper phthalocyanine, titanium dioxide, lithopone, chrome yellow, ultramarine blue, red cadmium, yellow cadmium, organic toners and lakes, and so on.

As stated previously, the use of a reactive, non-volatile monomer enables the elimination, or substantial reduction in amount of volatile, non-reactive organic solvent used or needed in the coating compositions. The organic solvents of this type that may be used include ketones such as acetone, methyl ethyl ketone and dioxane; hydrocarbons such as xylene, toluene, benzene as well as paraffinic or naphthenic types such as solvent naphthas, esters such as ethyl, propyl, butyl and amyl acetate as well as ethoxyethyl acetate, butoxyethyl acetate and the like, or ethers such as butyl ether ether. The solvent may comprise a mixture of several types but in any case, the solvent should be a type which does not contain an active hydrogen, as determined by the Zerewitinoff method, described in Kohler, et. al., *J. Amer. Chem. Soc.*, 40, 2181-8 (1972) and should also be substantially anhydrous.

Besides the pigments, dyes, or fillers mentioned above, catalysts, antioxidants and antiozonants, stabilizers, flow control agents, or other optional ingredients can also be included in these compositions of the invention.

These compositions of the invention can be used in forming films, paints, lacquers, varnishes, coatings, impregnants, and adhesives for both natural and synthetic materials, such as paper, textiles, wood, plastics, metal, and leather, as binders for non-woven fabrics, and in a wide variety of other uses. To prepare coatings and films, the compositions of the invention can be applied with or without solvent by casting permanently or removably onto a suitable substrate.

In earlier research relating to dicyclopentenyl functional monomers it was generally believed that these monomers underwent extensive chain transfer reactions during free radical polymerization and that about 40 percent by weight was the maximum level of dicyclopentenyl methacrylate and dicyclopentenyloxyethyl methacrylate that could be incorporated into a copolymer without gellation occurring. It has now been discovered that dicyclopentenyloxyethyl methacrylate (DCPOEMA) and dicyclopentenyl methacrylate (DCPMA) form linear homopolymers and linear copolymers with methacrylates by free radical polymerization. In all cases of free radical polymerization of DCPMA and/or DCPOEMA with an acrylate monomer, gellation or low conversion or both was obtained. It has also been shown that DCPOEMA and DCPMA copolymerize with styrene, vinyl toluene, and p-methyl styrene to form linear polymers.

Although the precise mechanism for these observations has not been identified with certainty, a simple reaction mechanism may account for them. Growing acrylate chain radicals undergo chain transfer with the dicyclopentenyl ring:

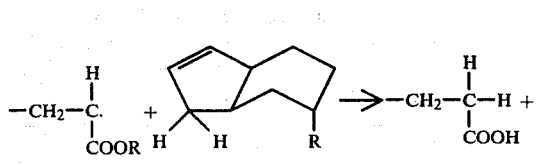

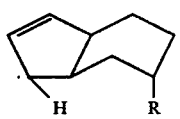

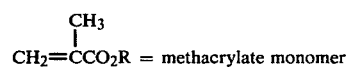

Growing methacrylate and styrene chain radicals, on the other hand, do not undergo this chain transfer. Thus, in the case where acrylate monomers are present with a dicyclopentenyl functional monomer, the dicyclopentenyl radicals formed coupled to each other or add to acrylates to form grafted side chains, either of which leads to gellation and/or low conversion. Where no acrylate monomers are present, linear chains result.

There is also no certain explanation for the remarkable and unexpected cure rate enhancement found with compositions of the present invention. As mentioned above, a mechanism for the oxygen inhibition of methacrylate monomer homopolymerization has already been suggested in the art. See F. R. Mayo and A. A. Miller, *J. Amer. Chem. Soc.*, 80: 2493 (1958). The following three equations, (1)–(3), represent the relatively slow formation of a copolymer containing alternating units of oxygen and methacrylate monomer which competes with the relatively rapid homopolymerization (i.e., between methacrylates) represented in equation (4):

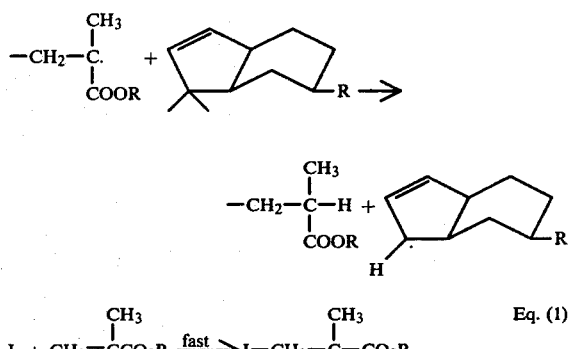

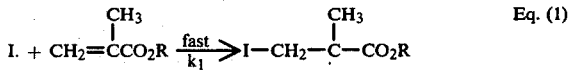
Eq. (1)

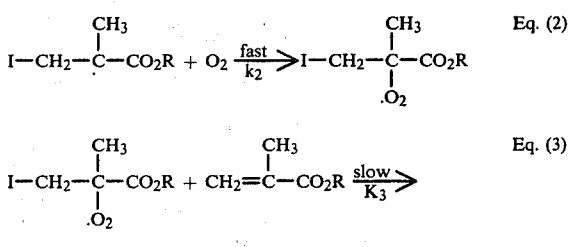
Eq. (2)

Eq. (3)

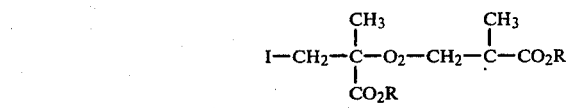

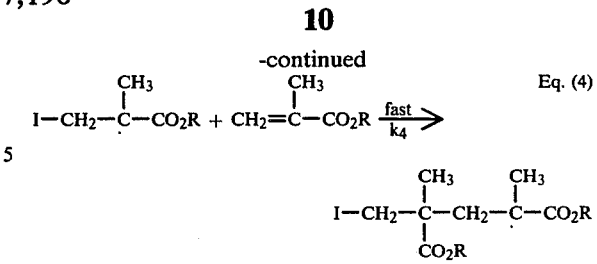
Eq. (4)

where $k_2 \gg k_4$
I. = free radical initiator

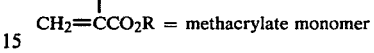
$CH_2=CCO_2R$ = methacrylate monomer

When the methacrylate monomer in the aforementioned equations is, for example, dicyclopentenyloxyethyl methacrylate, and the oxygen concentration becomes too high, the products of equations (2) and (3) begin to become competitive with the product of equation (4) and the inhibition phenomenon becomes particularly noticeable at or near the air/coating interface where oxygen concentrations are highest. Consequently, coating compositions based on dicyclopentenyloxyethyl methacrylate are considered to typically cure from the "bottom-up" under ambient conditions and the resulting cured coatings exhibit less than optimum surface cure as manifested by poor print and mar resistance.

The drying oil or alkyd resin component of the present invention is considered to be much more efficient at absorbing oxygen then dicyclopentenyloxyethyl methacrylate or dicyclopentenyl methacrylate. When the drying oil or alkyd resin is combined in a composition with these methacrylates, the reaction of equation (4) predominates over the reactions of equations (2) and (3) (even at the air coating interface) owing to the depletion of oxygen in the film. Thus, the cure of coating compositions of the invention are considered to begin at the interface and proceed from the "top-down".

Accordingly, one possible mechanism for the cure rate enhancement of compositions of the invention is that very rapid oxygen depletion occurs in the film, thereby creating sufficiently anaerobic conditions to produce advantageous homopolymerization, or copolymerization, of the methacrylate monomers.

Evidence supporting this proposed mechanism is provided by experiments wherein thin films of coatings containing these monomers in varying proportions, on an inert matrix, and 0.1% cobalt naphthenate are exposed to oxygen at ambient temperature to cure. When the monomer consists entirely of dicyclopentenyloxyethyl methacrylate, 2–4 days is required for cure and the monomer is converted, predominantly, to a copolymer containing alternating units derived from oxygen and monomer as determined by elemental and spectral analysis. When the monomer component consists of dicyclopentenyloxyethyl methacrylate and increasing proportions of the alkyd resin or drying oil, the time required for cure increasingly diminishes and progressively smaller percentages of the oxygen/methacrylate monomer unit copolymer are formed.

The following examples, in which all parts and percentages are by weight and the temperatures are in centigrade unless otherwise specified, are illustrative of but a few embodiments of the invention and are not to be construed as limiting the scope of the invention.

The abbreviations used in the examples are as follows:

DCPMA=dicyclopentenyl methacrylate
DCPOEMA=dicyclopentenyloxyethyl methacrylate
tBAEMA=t-butylaminoethyl methacrylate
DMAEMA=dimethylaminoethyl methacrylate
MMA=methyl methacrylate
TMPTMA=trimethylopropane trimethacrylate
VT=vinyl toluene
Set=set-to-touch time (hours)
TTF=touch-tack-free time (hours)
Zapon 500 g=Zapon hardness test at 500 g (ASTM Test Method D-1640-68)
KHN=Knoop Hardness Number (ASTM Test Method D-1474-68)
Rev. Imp.=Reverse Impact
MDC Patch=methylene dichloride patch
F=fluid
tBPOc (tBPO)=t-butylperoctoate

EXAMPLE 1

Low Molecular Weight Polymer of 95 DCPMA/5 tBAEMA

Xylene, 278 g., was stirred with a nitrogen sparge and heated to 103° C. in a one liter, four-necked flask fitted with thermometer, stirrer, reflux condenser protected by a drying tube, bent glass capillary tube, and a 500 ml. addition funnel. A mixture of 475 g. of distilled dicyclopentenyl methacrylate (DCPMA) and 25 g. of t-butylaminoethyl methacrylate (tBAEMA) was cooled in an ice bath and 42 g. of 97% t-butyl peroctoate (tBPOc) was added. The catalyzed monomer mixture was agitated vigorously, then kept chilled over the 245 minutes during which it was added dropwise to the flask contianing the solvent at 103°-104° C. The reaction mixture was held at 104° C. for one hour, then an additional portion of 4.2 g. of the tBPOc was added. The mixture was held at 104° C. for another two hours, then cooled to room temperature. The polymer solution at 63.1% solids had a Gardner-Holdt viscosity of Z-8. Gel permeation chromatography (low column, methyl methacrylate calibration) showed the following:

$M\overline{w} = 3.33 \times 10^4$
$M\overline{n} = 2.83 \times 10^3$
$M\overline{w}/M\overline{n} = 11.81$
d.p. = 13.0

EXAMPLE 2

Evaluation of Coating Compositions

The low molecular weight polymer of Example 1 was mixed with dicyclopentenyloxyethyl methacrylate DCPOE(M)A, a long oil alkyd resin (Aropla® 846-100, a mixed linseed/soya alkyd based upon isophthalic acid), and a drier. The coatings were evaluated on Bonderite 1000® test panels as 2 mil wet films (approx. 0.8-1 mil dry). The properties of several formulations are presented in Table I (A) and I (B).

TABLE I(A)

| EXPT | Alkyd[1]/Polymer[2]/Diluent[3] (% by weight) | Catalyst (% by weight) Co++[4] | Zr++[5] | GH Viscosity[6] 82% | 75% | 70% | 65%[6] | Curing (HRS) Set | TTF | Zapon500g. |
|---|---|---|---|---|---|---|---|---|---|---|
| A | 60/20/20 | 0.158 | — | W | P | L | D | 1 | 2 | 3.5 |
| B | 60/25/15 | " | — | Z | U | S | H | 1 | 2 | 2.5 |
| C | 60/15/25 | " | — | R | I | H | — | 1+ | 2 | 5.5 |
| D | 55/25/20 | " | — | Y | S | Q | F | 1 | 2 | 2.5 |
| E | 55/20/25 | " | — | V | L | K | — | 1 | 2 | 3.5 |
| F | 65/20/15 | " | — | X | R | O | F | 1+ | 2 | 3.5 |
| G | 65/15/20 | " | — | U | K | I | — | 1+ | 2 | 5.5 |
| H | 60/(20)[10]/20 | " | — | Q | H | F | — | 1+ | 3 | 7.0 |
| I | 60/(20)[11]/20 | " | — | X(80%) | — | Q | F | 1+ | 3 | 6.0 |
| J | 60/20/20 | 0.053 | — | — | — | — | — | 1+ | 2 | 3.5 |
| K | 60/20/20 | 0.105 | — | — | — | — | — | 1+ | 2 | 4.0 |
| L | 60/20/20 | 0.263 | — | — | — | — | — | 1+ | 2 | 3.5 |
| M | 60/20/20 | 0.158 | 0.20 | — | — | — | — | 1+ | 2 | 3.5 |
| N | 60/20/20 | " | 0.40 | — | — | — | — | 1+ | 2 | 3.5 |
| O | 100/—/— | " | — | Z(100%) | F | E | — | 1 | 1.5 | 5.0 |
| P | 80/—/20 | " | — | Y(100%) | D | C | — | 2 | 3 | 7.0 |

TABLE I(B)

| EXPT. | Alkyd[1]/Polymer[2]/Diluent[3] (% by weight) | Coating Properties[7] KHN | Rev.Imp. | MDC Patch | Appearance[8] Coating | Sol'n(70) | Estimated Solids[9] Spray | Brush |
|---|---|---|---|---|---|---|---|---|
| A | 60/20/20 | 5.17 | 20-50 | swelled | clear | lt. skin | 62 | 77-84 |
| B | 60/25/15 | 6.48 | 2-10 | " | " | mod. skin | 57 | 73-80 |
| C | 60/15/25 | 4.24 | 20-50 | " | " | gel | 63 | 84-93 |
| D | 55/25/20 | 8.45 | 2-10 | " | " | mod. skin | 60 | 75-81 |
| E | 55/20/25 | 7.10 | 2-10 | " | " | " | 64 | 79-86 |
| F | 65/20/15 | 5.12 | 50-100 | " | " | lt. skin | 62 | 77-89 |
| G | 65/15/20 | 4.10 | 50-100 | " | " | " | 63 | 82-90 |
| H | 60/(20)[10]/20 | 2.47 | 20-30 | " | " | gel | 65 | 85-93 |
| I | 60/(20)[11]/20 | ~2.4 | 2-10 | " | hazy | hazy gel | 62 | 77-84 |
| J | 60/20/20 | 3.16 | <2 | " | clear | mod. skin | — | |
| K | 60/20/20 | 4.54 | 20-50 | " | " | lt. skin | — | |
| L | 60/20/20 | 5.03 | 20-50 | " | " | lt. skin | — | |
| M | 60/20/20 | 4.78 | <2 | " | heav.ripple | lt. skin | — | |
| N | 60/20/20 | — | — | " | rippled | hazy, lt. skin | — | |
| O | 100/—/— | Rubbery | >100 | " | clear | lt. skin | 63 | 84-93 |

TABLE I(B)-continued

| EXPT. | Alkyd[1]/Polymer[2]/Diluent[3] (% by weight) | Coating Properties[7] | | | Appearance[8] | | Estimated Solids[9] | |
|---|---|---|---|---|---|---|---|---|
| | | KHN | Rev.Imp. | MDC Patch | Coating | Sol'n(70) | Spray | Brush |
| P | 80/—/20 | 1.32 | >100 | " | " | " | 70 | 90–99 |

Footnotes to Tables I(A) and I(B):

[1] Aroplaz® E 846-100, a long oil alkyd resin based on linseed oil/soya oil/isophthalic acid available from Spencer Kellogg.
[2] Polymer of Example 1 - DCPMA/tBAEMA//95/5—except where otherwise noted.
[3] Diluent = dicyclopentenyloxyethyl methacrylate (DCPOEMA).
[4] A cobalt carboxylate available from Mooney as Ten-Chem®, containing 6% Co based on solids of composition.
[5] HED Zirconium 24%, ® a Zirconium salt solution available from Ferro Co.
[6] Coating compositions diluted with xylene to give percentage indicated in parenthesis of componets (alkyd/polymer/diluent) for determination of Gardner-Holt (GH) viscosities.
[7] Properties measured on coatings cast as 2 mil coatings cured for 5 days at 25° C. and 1 day at 60° C.
KHN = Knoop Hardness Number
Rev.Imp = Reverse Impact
MDC Patch = Methylene Dichloride
[8] Subjective appearance of the casted coating ("Coating") and of the coating composition stored in solution for 7 days at 25° C. ("Sol'n").
[9] Estimated Solids derived from semi-log plot of viscosity data; Spray—GH, A-B (60 cps); Brush (600–1300 cps).
[10] Copolymer of MMA/IBOMA/tBAEMA/MAA//49/49/1.5/0.5
[11] Copolymer of IBOMA/tBAEMA//95/5 ($\overline{Mw} = 7.7 \times 10^3$ and $\overline{Mn} = 1.91 \times 10^3$)

As shown in Table I (A), the compositions containing the low molecular weight polymer of Example 1, when cast as 2 mil wet films (approximately 0.8–1 mil dry), passed the Zapon 500 g test in 2.5 to 5.5 hours, set in about one hour, and were touch-tack-free in two hours. Compositions containing other polymers (Experiments H and I) were considerably more viscous (i.e., would require lower coating solids), required longer to become touch-tack-free, and required 6–7 hours to pass the Zapon 500 g test. All of the compositions containing the polymer according to the invention were relatively stable without the use of Exkin® (Nuodex Products Company) oxime cobalt stabilizers. Further, the compositions of the invention showed hardness and properties typical of industrial finishes based upon medium and short oil alkyds, but at coating solids 20–30 percent higher. Comparing Experiment P, having only the alkyd resin, diluent and drier, with the experiments having the alkyd resin, polymer, diluent and drier, it is apparent that addition of the polymer provides a superior curing rate and hardness.

EXAMPLE 3

Evaluation of Coating Compositions

A low molecular weight polymer similar to that of Example 1 but having the molecular weight, $\overline{Mw} = 4.88 \times 10^4$ and $\overline{Mn} = 4.28 \times 10^3$ was mixed with dicyclopentenyloxyethyl methacrylate, a long oil linseed alkyd resin (Aroplaz® 1271, Spencer Kellogg), and a drier. Tests of the films obtained using these compositions were conducted as in Example 2 and are reported in Tables II (A) and II (B).

TABLE II(A)

| EXPT | Alkyd[1]/Polymer[2]/Diluent[3,4] (% by weight) | GH Viscosity | | Curing (HRS) | | |
|---|---|---|---|---|---|---|
| | | 75% | 60% | SET | TTF | Zapon500 |
| A | 60/20/20 | I+ | B | 1 | 2 | 4 |
| B | 60/15/25 | D | Al | 1 | 2 | 3 |
| C | 60/25/15 | P | D | 1 | 2 | 4 |
| D | 55/25/20 | M | C | 1 | 2 | 5 |
| E | 55/20/25 | F | A | <2 | 2 | 4 |
| F | 65/20/15 | J | C– | 1 | 2 | 4 |
| G | 65/15/20 | E | A | <2 | 2 | 6 |
| H | 60[7]/20/20 | Q | E | 1 | 2 | 3 |
| I | —/100/— | — | — | <1 | <1 | <1 |
| J | —/100[8]/— | — | — | <1 | <1 | <1 |
| K | 60/20[8]/20 | D | Al | 2 | 3 | 5 |
| L | 60/20[9]/20 | Q | E | 1 | 2 | 6 |
| M | 60/20[10]/20 | K | D | 2 | 4 | 5 |
| N | 60[7]/20[10]/20 | G | A | 3 | 4 | <24 |
| O | —/100/— | — | — | <1 | <1 | <1 |
| P | 60[7]/20[9]/20 | U | I– | 1 | 3 | 4 |

TABLE II(B)

| EXPT. | Alkyd[1]/Polymer[2]/Diluent[3,4] (% by weight) | Properties | | | Appearance | | Est.Solids[6] |
|---|---|---|---|---|---|---|---|
| | | KHN | Rev.Imp. | MDC Patch | Coating | Sol'n[5] | Spray |
| A | 60/20/20 | 11.4 | <2 | swelled | clear, glossy | F | 64 |
| B | 60/15/25 | 12.8 | <2 | " | " | F | 71 |
| C | 60/25/15 | 9.14 | <2 | " | wrinkled | F | 61 |
| D | 55/25/20 | 3.91 | <2 | " | " | F | 63 |
| E | 55/20/25 | 11.9 | <2 | " | clear, glossy | F | 67 |
| F | 65/20/15 | 14.8 | 2–10 | " | " | F | 63 |
| G | 65/15/20 | 3.40 | 2–10 | " | wrinkled | F | 66 |
| H | 60[7]/20/20 | 8.83 | 20–50 | " | clear, glossy | skin | 60 |
| I | —/100/— | — | — | — | crazed | F | — |
| J | —/100[8]/— | — | — | — | " | F | — |
| K | 60/20[8]/20 | 7.57 | <2 | swelled | clear, glossy | F | 71 |
| L | 60/20[9]/20 | 4.26 | >100 | " | " | sli.skin | 60 |
| M | 60/20[10]/20 | 8.64 | <2 | " | clear, glossy | F | 61 |
| N | 60[7]/20[10]/20 | 4.12 | 2–10 | " | " | F | 64 |
| O | —/100/— | 15.2 | <2 | " | " | sli.skin | — |

TABLE II(B)-continued

| EXPT. | Alkyd[1]/Polymer[2]/Diluent[3,4] (% by weight) | Properties KHN | Rev.Imp. | MDC Patch | Appearance Coating | Sol'n[5] | Est.Solids[6] Spray |
|---|---|---|---|---|---|---|---|
| P | 60[7]/20[9]/20 | 2.09 | <2 | " | dull, matte | skin | 52 |

Footnotes to Tables II(A) and II(B):
[1]Aroplaz® 1271, a long oil linseed alkyd resin available from Spencer Kellogg - except where otherwise noted.
[2]DCPMA/tBAEMA//95/5 - see Example 1—except where otherwise noted.
[3]Reactive diluent monomer - DCPOEMA.
[4]A cobalt carboxylate available from Mooney as Ten-Chem® containing 6% Co based on solids of composition.
[5]Solutions after 60 days at 25° C.
[6]Solids at 60 centistokes by extrapolation.
[7]Aroplaz® 846-100 (see Example 2).
[8]Copolymer of IBOMA/tBAEMA//95/5($\bar{M}w = 7.7 \times 10^3$ and $\bar{M}n = 1.91 \times 10^3$).
[9]Copolymer of isobornyl methacrylate/tBAEMA//97/3($\bar{M}w = 7.7 \times 10^3$ and $\bar{M}n = 1.91 \times 10^3$).
[10]Copolymer of DCPOEMA/tBAEMA//95/5.

EXAMPLE 4
Evaluation of Coating Compositions

A low molecular weight polymer similar to that of Example 1 but having a $\bar{M}w = 4.88 \times 10^4$ and $\bar{M}n = 4.28 \times 10^3$ was mixed with dicyclopentenyloxyethyl methacrylate, a long oil soybean alkyd (Aroplaz® 1272, Spencer Kellogg, and a drier. Tests of the films obtained using these compositions were conducted as in Example 2 and are reported in Tables III (A) and III (B).

The compositions of Examples 3 and 4 containing the polymer, DCPMA/tBAEMA//95/5 $\bar{M}w = 4.88 \times 10^4$ and $\bar{M}n = 4.28 \times 10^3$, with Aroplaz® 1271 or Aroplaz® 1272, respectively, instead of Aroplaz® 846-100 (as in Example 2) provided films with drying, coating solids and physical properties similar to the corresponding compositions of Example 2. The linseed alkyd system showed a distinct advantage over the soya alkyd system in drying speed, especially in the early stages.

EXAMPLE 5
Evaluation of Coating Compositions

This example further illustrates coating compositions according to the invention containing Aroplaz® 1271 as the film-forming component, DCPOEMA as the diluent monomer, and several other suitable low molecular weight polymers. Tests of films obtained using these compositions were conducted as in Example 2 and are reported in Table IV. Each of the coating compositions reported in Table IV contains sixty (60) parts by weight of the Aroplaz® 1271, twenty (20) parts by weight of DCPOEMA, and twenty (20) parts by weight of polymer. The composition of the conditions of synthesis of the polymer component and the coating properties are outlined in the Table.

TABLE III(A)

| EXPT. | Alkyd[1]/Polymer[2]/Diluent[3,4] (% by weight) | GH Viscosity 75% | 60% | Curing (HRS) SET | TTF | Zapon500 |
|---|---|---|---|---|---|---|
| A | 60/20/20 | H | B | <2 | 3 | 4 |
| B | 60/15/25 | D | A1 | <2 | 4 | 5 |
| C | 60/25/15 | P | D | <2 | 2 | 6 |
| D | 55/25/20 | M | C | <2 | 3 | 4 |
| E | 55/20/25 | F | A | <2 | 3 | 4 |
| F | 65/20/15 | J | B+ | <2 | 3 | 6 |
| G | 65/15/20 | E | A | <2 | 4 | 5 |
| H | 60/20[8]/20 | C | A1 | 3 | 4 | >24 |
| I | 60/20[9]/20 | Q | E | 3 | 4 | >24 |
| J | 60/20[10]/20 | G | A | 1 | 3 | 5 |

TABLE III(B)

| EXPT. | Alkyd[1]/Polymer[2]/Diluent[3,4] (% by weight) | Coating Properties[5] KHN | Rev.Imp. | MDC Patch | Appearance Coating | Est.Solids Soln[6] | Spray[7] |
|---|---|---|---|---|---|---|---|
| A | 60/20/20 | 8.19 | 2-10 | swelled | clear, glossy | F | 64 |
| B | 60/15/25 | 4.78 | 10-20 | " | " | F | 71 |
| C | 60/25/15 | 8.35 | <2 | " | " | F | 61 |
| D | 55/25/20 | 10.3 | <2 | " | " | F | 63 |
| E | 55/20/25 | 10.3 | <2 | " | " | F | 67 |
| F | 65/20/15 | 5.61 | 10-20 | " | " | F | 63 |
| G | 65/15/20 | 4.54 | 10-20 | " | " | F | 67 |
| H | 60/20[8]/20 | 2.52 | <2 | " | " | F | 71 |
| I | 60/20[9]/20 | 1.67 | <2 | " | " | F | 60 |
| J | 60/20[10]/20 | 4.54 | <2 | " | " | F | 64 |

Footnotes to Tables III(A) and III(B):
[1]Aroplaz® 1271, a long oil soya alkyd resin available from Spencer Kellogg.
[2]DCPMA/tBAEMA//95/5($\bar{M}w = 4.88 \times 10^4$ and $\bar{M}n = 4.28 \times 10^3$) - except where otherwise noted.
[3]Reactive diluent monomer = DCPOEMA.
[4]A cobalt carboxylate available from Mooney as Ten-Chem®, containing 6% Co based on solids of composition.
[5]Properties measured on coatings cured 1 week at 25° C. and 1 day at 60° C.
[6]Solids at 60 centistokes by extrapolation.
[7]After 60 days at 25° C.
[8]Copolymer of IBOMA/tBAEMA//95/5($\bar{M}w = 7.7 \times 10^3$ and $\bar{M}n = 1.91 \times 10^3$).
[9]Copolymer of isbornyl methacrylate/tBAEMA//97/3.
[10]Copolymer of DCPOEMA/tBAEMA//95/5.

TABLE IV

| EXPT.[1] | Polymer[1] Synthesis Composition (% by weight) DCPMA | DCPOEMA | IBMA[3] | VT[4] | DMAEMA[5] | Synthesis $\bar{M}n$ | $\bar{M}w$ | $\bar{M}w/\bar{M}n$ | d.p. | % Solids[6] | Coating Properties ←HRS→ Set | TTF | Z[7]500 g. |
|---|---|---|---|---|---|---|---|---|---|---|---|---|---|
| A | 95.8 | — | — | — | 4.2 | 4.8 | 18 | 3.8 | 22 | 64.8 | 2 | 2½ | 8 |
| B | — | 95.8 | — | — | 4.2 | 6.5 | 20 | 3.0 | 25 | 61.7 | 2½ | 4 | 32 |

TABLE IV-continued

| EXPT.[1] | Polymer[1] Synthesis | | | | | Synthesis | | | | | Coating Properties | | |
|---|---|---|---|---|---|---|---|---|---|---|---|---|---|
| | Composition (% by weight) | | | | | | | | | | ←HRS→ | | |
| | DCPMA | DCPOEMA | IBMA[3] | VT[4] | DMAEMA[5] | $\overline{Mn}$ | $\overline{Mw}$ | $\overline{Mw}/\overline{Mn}$ | d.p. | % Solids[6] | Set | TTF | Z[7]500 g. |
| C | — | 75 | 22 | — | 3 | 6.5 | 17 | 2.7 | 30 | 56.9 | 2½ | 6 | 32 |
| D | 75 | — | 22 | — | 3 | 5.3 | 17 | 3.2 | 27 | 58.8 | 2 | 4 | 7 |
| E | — | 75 | — | 22 | 3 | 5.4 | 30 | 5.5 | 26 | 55.9 | 2½ | 6 | 32 |

[1]Coating Composition = 60 Aroplaz® 1271/20/DCPOEMA/20 Polymer.
[2]Catalyst = 0.5 parts by weight t-butyl peroctoate + 2.2 parts by weight dodecyl mercaptan.
[3]IBMA = isobutyl methacrylate
[4]VT = vinyl toluene
[5]DMAEMA = dimethylaminoethyl methacrylate
[6]Solvent: Expts. A & B = xylene; Expts. C, D & E = V and PM Naphtha
[7]Z 500 g = Zapon 500 g test results

EXAMPLE 6

This example illustrates coating compositions according to the invention containing drying oils or mixtures of drying oils or mixtures of drying oils with an alkyd resin as the film-forming component, DCPOEMA or trimethylolpropane trimethacrylate (TMPTMA) or mixtures thereof as the diluent monomer, a polymer of DCPMA/tBAEMA/MAA//98/1.5/0.5 having $\overline{Mn}=2600$, $\overline{Mw}=6500$, $\overline{Mw}/\overline{Mn}=2.5$, and Ten-Chem® curing catalyst. The compositions were cast on Bonderite® 40 test panels as 4 mil (wet) films. The compositions (parts by weight) and the results of the tests of the films are reported in Table V.

TABLE V[1]

| | Film-forming Component | | | Diluent Monomer | | | COATING PROPERTIES | | | | |
|---|---|---|---|---|---|---|---|---|---|---|---|
| | | | | | | | | ←HRS→ | | | |
| Expt. | Linseed Oil | Dehydrated Castor Oil | Aroplaz 846-100 | DCPOEMA | TMPTMA | Polymer | % Solids | Set | TFF | Z500 g | Stability |
| A | 60 | — | — | — | — | 40 | 81 | 1 | 2.5 | 5 | Fluid |
| B | 50 | — | — | 10 | 10 | 30 | 85 | 1.5 | 2.5 | 4.5 | Gel |
| C | 55 | — | — | — | 5 | 40 | 81 | 1.5 | 2.5 | 5 | Fluid |
| D | 55 | — | — | 20 | — | 25 | 87.2 | 3 | 3.5 | 4.5 | Gel |
| E | 60 | — | — | 10 | 10 | 20 | 89.5 | 3 | 3.5 | 6 | Gel |
| F | — | 55 | — | — | 5 | 40 | 81 | 1 | 2.5 | 7 | Fluid |
| G | 25 | 25 | — | — | 10 | 40 | 81 | 0.5 | 1.5 | 4.5 | Fluid |
| H | 25 | 25 | — | 10 | 10 | 30 | 85 | 1.5 | 2.5 | 7 | Gel |
| I | 36.5 | 13.6 | — | 13.6 | 40 | 22.7 | 88.2 | 3 | 3.5 | 6 | Gel |
| J | 30 | — | 25 | 18 | 2 | 25 | 87.2 | 3 | 3.5 | 5 | Fluid |
| K | 20 | 10 | 25 | 18 | 2 | 25 | 87.2 | 2 | 3.5 | 5 | Fluid |

[1]Abbreviations are as defined/described hereinabove.

I claim:
1. A composition for coating and/or impregnating purposes, adapted for curing by autoxidation at ambient temperature, consisting essentially of:
  (1) from about 35% to about 80% by weight, based on the total weight of components (1), (2), and (3), of a film-forming component selected from the group consisting of drying oils, alkyd resins, and mixtures of drying oils and alkyd resins;
  (2) from about 10% to about 50% by weight, based on the total weight of components (1), (2), and (3), of a polymer of a number average molecular weight ($\overline{Mn}$) in the range of 1,000–50,000 polymerized from a monomer system comprising:
    (a) from about 40% to 99.5% by weight of at least one monomer selected from the group consisting of dicyclopentenyl methacrylate and dicyclopentenyloxyalkyl methacrylate, and
    (b) from about 60% to about 0.5% by weight of at least one of t-butylaminoethylmethacrylate and dimethylaminoethyl methacrylate;
  (3) from about 5% to about 25% by weight, based on the total weight of components (1), (2), and (3), of a reactive non-volatile diluent monomer; and
  (4) an effective amount of at least one polyvalent metal salt or complex that catalyzes the oxidative curing of components (1), (2), and (3); wherein the total of the percents of components (1), (2), and (3) is 100.

2. The composition of claim 1 wherein said reactive, non-volatile diluent monomer is selected from the group consisting of dicyclopentenyloxyethyl methacrylate, dicyclopentenyl methacrylate, dicyclopentanyl (meth)acrylate, trimethylolpropane triacrylate, 1,4-butanediol diacrylate, 1,6-hexanediol diacrylate, 1,3-propanediol diacrylate, 1,2-ethylene diacrylate, 1,2-propanediol diacrylate, allyl methacrylate, hydroxyethyl methacrylate, allyl phthalate and di-, tri-, and polyesters of acryloxypropionic acid.

3. The composition of claim 1, wherein the polymer has a number average molecular weight (Mn) of from 2,000 to 15,000 ($\overline{Mn}$).

4. The composition of claim 1, wherein the polymer is from about 15% to about 25% by weight, based on the total weight of components (1), (2), and (3).

5. The composition of claim 1, wherein the polymer comprises from about 90% to about 99.5% of component (a) and from about 0.5% to about 10% of component (b).

6. The composition of claim 1, wherein the polymer comprises dicyclopentenyl methacrylate and t-butylaminoethyl methacrylate.

7. The composition of claim 6 wherein said polymer further comprises from about 0.1% to about 2% by weight of methacrylic acid.

8. The composition of claim 1, wherein the polymer comprises dicyclopentenyl methacrylate and dimethylaminoethyl methacrylate.

9. The composition of claim 8 wherein the polymer further comprises from about 0.1% to about 2% of methacrylic acid.

10. The composition of claim 1, wherein the polymer comprises dicyclopentenyloxyethyl methacrylate and t-butylaminoethyl methacrylate.

11. The composition of claim 1, wherein the polymer comprises dicyclopentenyloxyethyl methacrylate and dimethylaminoethyl methacrylate.

12. The composition of claim 1, wherein the polymer comprises dicyclopentenyloxyethyl methacrylate, t-butylaminoethyl methacrylate and isobornyl methacrylate.

13. The composition of claim 1, wherein the film-forming component is linseed oil alkyd resin.

14. The composition of claim 1, wherein the film-forming component is from about 40% to about 60% by weight, based on the total weight of components (1), (2), and (3).

15. The composition of claim 1, wherein the reactive, non-volatile diluent monomer is dicyclopentenyloxyethyl methacrylate.

16. The composition of claim 1, wherein the reactive, non-volatile diluent monomer is dicyclopentenyl methacrylate.

17. The composition of claim 1 wherein the reactive, non-volatile diluent monomer is dicyclopentenyl acrylate.

18. The composition of claim 1, wherein the reactive, non-volatile diluent monomer is a polyfunctional methacrylate.

19. The composition of claim 1 wherein the reactive, non-volatile diluent monomer is a polyfunctional acrylate.

20. The composition of claim 1, wherein the reactive, non-volatile diluent monomer is hydroxypropyl methacrylate.

21. The composition of claim 1, wherein the reactive, non-volatile diluent monomer is from about 5% to about 25% by weight, based on the total weight of components (1), (2) and (3).

22. The composition of claim 1, further comprising a volatile oxime stabilizer.

23. A cured article obtained by the autoxidation in the presence of oxygen of the composition of claim 1.

24. A composition for coating and/or impregnating purposes, adapted for curing by autoxidation at ambient temperature, consisting essentially of:
(1) from about 35% to about 80% by weight, based on the total weight of compounds (1), (2), and (3), of a film-forming component selected from the group consisting of drying oils, and mixture of drying oils and alkyd resins;
(2) from about 10% to about 50% by weight, based on the total weight of components (1), (2), and (3), of a polymer of a number average molecular weight ($\overline{M_n}$) in the range of 1,000–50,000 polymerized from a monomer system comprising:
 (a) from about 40% to 99.5% by weight of at least one monomer selected from the group consisting of dicyclopentenyl methacrylate and dicyclopentenyloxyalkyl methacrylate, and
 (b) from about 60% to 0.5% by weight of at least one of t-butylaminoethyl methacrylate and dimethylaminoethyl methacrylate; and
(3) an effective amount of at least one polyvalent metal salt or complex that catalyzes the oxidative curing of components (1) and (2); wherein the total of the percents of components (1), (2) and (3) is 100.

* * * * *